(12) United States Patent
Kudo et al.

(10) Patent No.: US 11,763,379 B2
(45) Date of Patent: *Sep. 19, 2023

(54) BID-OFFER CONDITION DETERMINATION APPARATUS FOR ELECTRICITY TRANSACTION BY MOBILE OBJECT

(71) Applicant: TOYOTA JIDOSHA KABUSHIKI KAISHA, Toyota (JP)

(72) Inventors: Yuki Kudo, Susono (JP); Kazuki Obata, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 43 days.

This patent is subject to a terminal disclaimer.

(21) Appl. No.: 17/470,182

(22) Filed: Sep. 9, 2021

(65) Prior Publication Data

US 2022/0122164 A1 Apr. 21, 2022

(30) Foreign Application Priority Data

Oct. 16, 2020 (JP) .................................. 2020-174561

(51) Int. Cl.
*G06Q 30/08* (2012.01)
*G06Q 30/0201* (2023.01)
(Continued)

(52) U.S. Cl.
CPC ......... *G06Q 30/08* (2013.01); *G06Q 30/0205* (2013.01); *G06Q 30/0206* (2013.01); *G06Q 30/0284* (2013.01); *G06Q 50/06* (2013.01)

(58) Field of Classification Search
None
See application file for complete search history.

(56) References Cited

U.S. PATENT DOCUMENTS 10,304,099 B2 * 5/2019 Basak .................... G06Q 30/08
2005/0004858 A1   1/2005 Foster et al.
(Continued)

FOREIGN PATENT DOCUMENTS

DE   202022106297 U1 * 12/2022
JP   2012-196028 A   10/2012
(Continued)

OTHER PUBLICATIONS

JP-2021149282-A machine translation (Year: 2021).*
(Continued)

*Primary Examiner* — Paul S Schwarzenberg
(74) *Attorney, Agent, or Firm* — Finnegan, Henderson, Farabow, Garrett & Dunner, LLP

(57) ABSTRACT

An apparatus, for a mobile object, that determines a bid-offer condition on an electricity transaction market: acquires information on sell-buy prices for an electricity amount presented by electricity demanders on direct transaction markets, where a contract is executed for electricity that the mobile object directly supplies to or procures from an electricity demander; determines, based on the sell-buy prices, an optimal condition that maximizes a profit from an electricity transaction for the mobile object; and determines, as the bid-offer condition, to place an offer or a bid on an electricity transaction market at a sell or buy price for a to-be-discharged or to-be-charged electricity amount that are determined for each time period in the optimal condition. The sell-buy prices for the electricity amount presented by the electricity demanders on the direct transaction markets are acquired through prediction, or notification from the individual electricity demanders.

6 Claims, 10 Drawing Sheets

(51) Int. Cl.
*G06Q 50/06* (2012.01)
*G06Q 30/0283* (2023.01)
*G06Q 30/0204* (2023.01)

(56) References Cited

U.S. PATENT DOCUMENTS

| | | |
|---|---|---|
| 2013/0218744 A1 | 8/2013 | Chassin et al. |
| 2018/0204232 A1* | 7/2018 | Chambers .......... G06Q 10/1093 |
| 2019/0333166 A1 | 10/2019 | Simpson |
| 2020/0082422 A1 | 3/2020 | Sun |
| 2020/0160411 A1 | 5/2020 | Sun et al. |
| 2020/0286188 A1 | 9/2020 | Sohn et al. |
| 2021/0019821 A1 | 1/2021 | Achar et al. |
| 2022/0122163 A1 | 4/2022 | Obata et al. |
| 2023/0013447 A1* | 1/2023 | Yamauchi ............. B60L 53/305 |

FOREIGN PATENT DOCUMENTS

| | | |
|---|---|---|
| JP | 2020-009334 A | 1/2020 |
| JP | 2020-043634 A | 3/2020 |
| JP | 2020-091529 A | 6/2020 |
| JP | 2020-178472 A | 10/2020 |
| JP | 6783190 B2 * | 11/2020 |
| JP | 2021149282 A * | 9/2021 |
| KR | 10-2012-0000116 A | 1/2012 |
| KR | 20220138644 A * | 4/2021 |
| WO | WO-2022253126 A1 * | 12/2022 |

OTHER PUBLICATIONS

U.S. Appl. No. 17/407,403, filed Aug. 20, 2021.
Office Action issued in U.S. Appl. No. 17/407,403 dated Nov. 23, 2022.
Notice of Allowance issued in U.S. Appl. No. 17/407,403 dated May 19, 2023.

* cited by examiner

FIG. 2B

GENERAL TRANSACTION

| BUY | UNIT TIME PERIOD | SELL |
|---|---|---|
| (p, q) (p, q) | 1 | (P, Q) (P, Q) (P, Q) |
| (p, q) (p, q) | 2 | (P, Q) (P, Q) |
| (p, q) | 3 | (P, Q) |
| ⋮ | ⋮ | |
| (p, q) | n | (P, Q) (P, Q) |

↓ TIME

FIG. 2C

DIRECT TRANSACTION

| DEMANDER | UNIT TIME PERIOD | ELECTRICALLY DRIVEN VEHICLE |
|---|---|---|
| (p, q) | 1 | (P, Q) (P, Q) (P, Q) |
| (p, q) | 2 | (P, Q) (P, Q) |
| (p, q) | 3 | (P, Q) |
| ⋮ | ⋮ | |
| (p, q) | n | (P, Q) (P, Q) |

↓ TIME

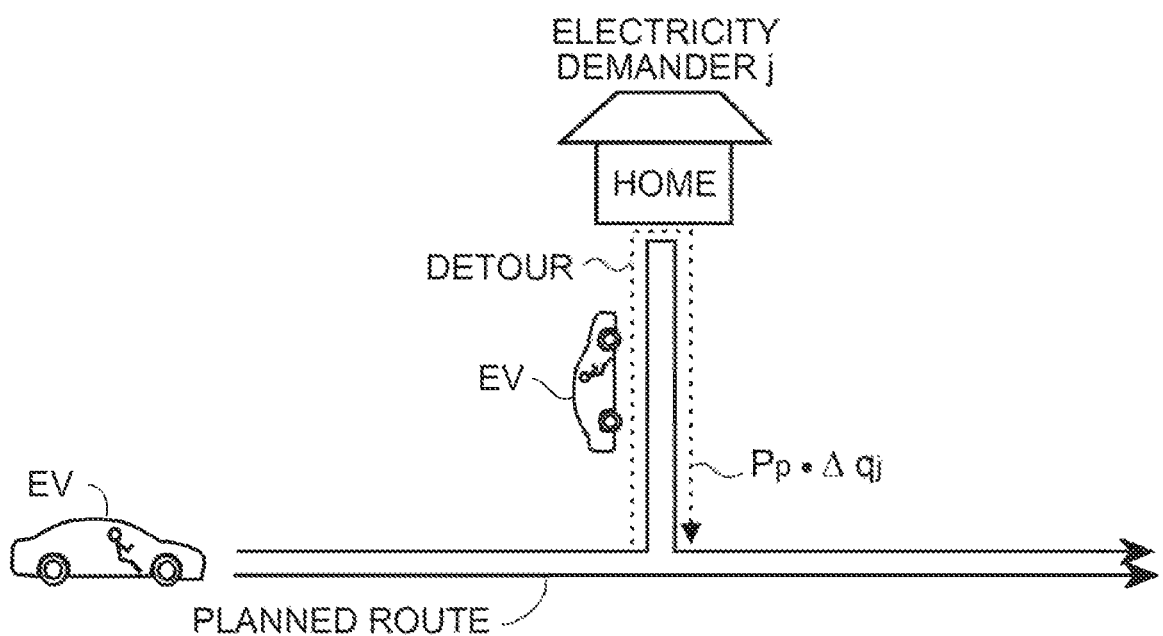

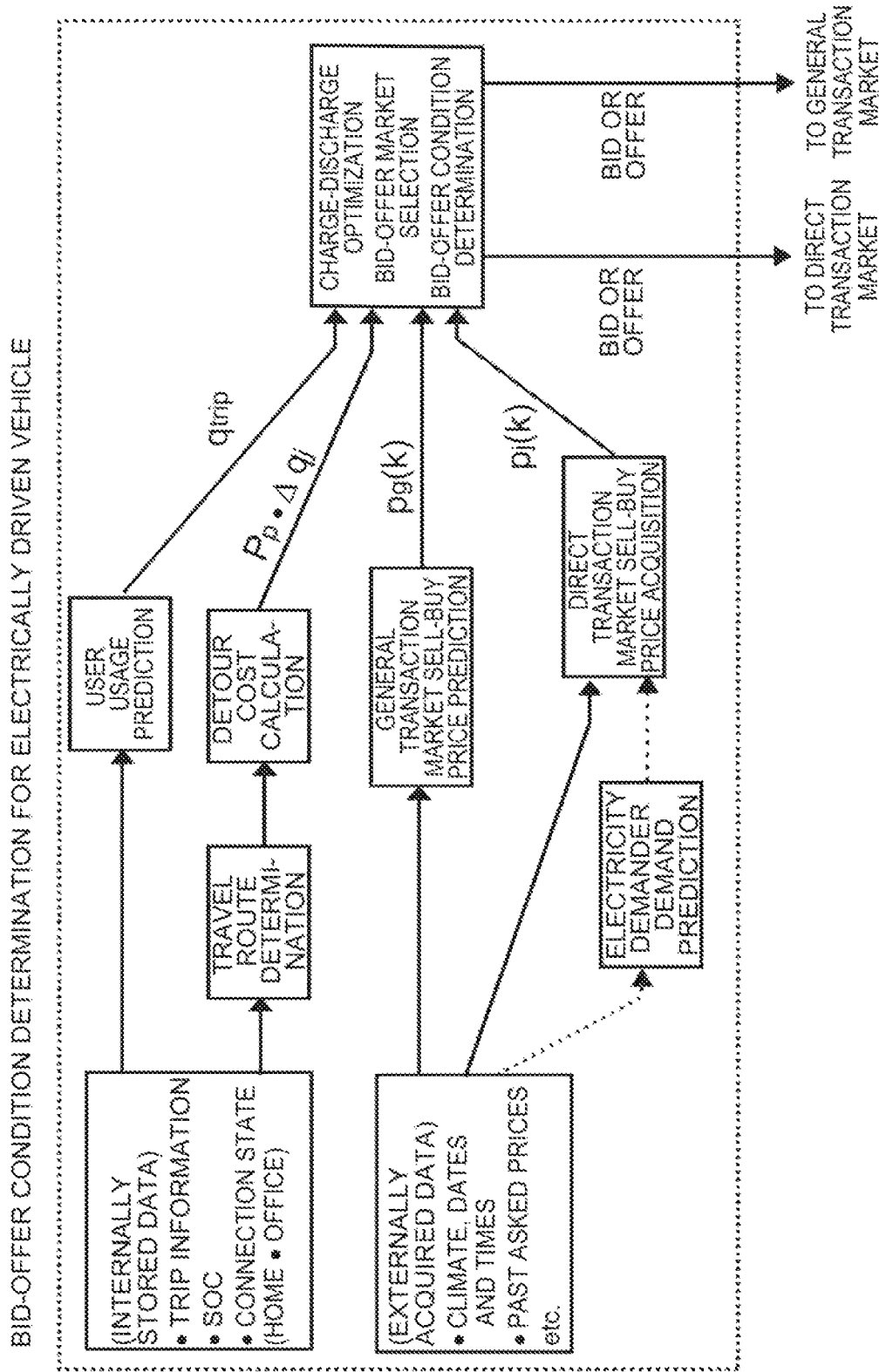

BID-OFFER CONDITION DETERMINATION APPARATUS FOR ELECTRICITY TRANSACTION BY MOBILE OBJECT

CROSS-REFERENCE TO RELATED APPLICATION

This application claims priority to Japanese Patent Application No. 2020-174561 filed on Oct. 16, 2020, incorporated herein by reference in its entirety.

BACKGROUND

1. Technical Field

The present disclosure relates to a system for transactions of selling and buying electricity (electricity transaction system) and, more specifically, to an apparatus that determines a bid-offer condition for a mobile object such as an automobile to place an offer to sell or a bid to buy electricity on a market where P2P (Peer to Peer) electricity transactions are conducted.

2. Description of Related Art

Liberalization of electricity has enabled transactions of selling and buying electricity on a market. Moreover, introduction of P2P (Peer to Peer) electricity transactions has been considered, in which transactions of selling and buying electricity are conducted not only by electric power companies, but also conducted directly between an individual or corporate person owning electricity resources and a demander that is a different individual or corporate person. With such trends, various technologies have been proposed for new forms of transactions of selling and buying electricity after the liberalization of electricity. For example, Japanese Patent Application Publication No. 2012-196028 proposes a system (a system that performs a "peak-cut" of electricity in an in-factory facility) that is an electricity management system for allowing electricity stored in a battery of an electric vehicle to be utilized in a facility where a large amount of electricity is in demand such as a factory, wherein the amount of electricity used from grid electricity is controlled such as not to exceed a predetermined amount of electricity by causing the battery, which is a driving source for the electric vehicle to travel and is connected to the in-factory facility, or a stationary storage battery in the in-factory facility to discharge electricity for a period when the amount of electricity consumed by an in-factory load on the in-factory facility is the largest, and by using the discharged electricity to compensate for a shortfall in the grid electricity. Japanese Patent Application Publication No. 2020-43634 proposes an electricity transaction amount optimization apparatus that can calculate electricity transaction amounts that maximize a profit from electricity transactions in an entire group including electric vehicles and demanders dotting a predetermined area, wherein an electricity transaction amount to be traded by each electric vehicle and each demander in the group with the other party of an electricity transaction is calculated by performing optimization calculation using an objective function to maximize the profit from the electricity transactions in the entire group, based on: a constraint condition that meets an amount of electricity demanded by each electric vehicle in an electricity transaction the electric vehicle involves in; a constraint condition that meets an amount of electricity demanded by each demander in an electricity transaction the demander involves in; and a constraint condition of an amount of tradable electricity occurring when the electric vehicles and the demanders conduct electricity transactions with the other parties of the respective electricity transactions by using electric power transmission and distribution networks in the predetermined area. As an electricity transaction platform that enables electricity to be sold by small-scale individual homes and bought by a corporation, a local government, and the like at a fair fixed price, and that enables both the electricity and an environmental value included in the electricity to be traded while establishing usage of the environmental value, Japanese Patent Application Publication No. 2020-9334 proposes a configuration in which: a general consumer and a first demander are provided with storage batteries; each of computers of demanders and the like, a person with a power generator, and the Japan Electric Power Exchange is connected to a server of an operator as equals via a P2P computer network; a smart meter, an HEMS, and a DC-AC converter are connected to each of the computers of the demanders and the like and are configured in a controllable manner; and electricity sold and bought by the demanders and the like via an electric power network is managed by a distributed ledger based on blockchain technology. As a technique of ensuring traceability of renewable energy generated electricity, Japanese Patent Application Publication No. 2020-91529 proposes an electricity transaction history generation system configured such that an operator account that records tokens issued in a blockchain, a supplier account of an electricity supplier, and a demander account of an electricity demander are managed by the blockchain, and a transaction history generation apparatus: stores, for each demander, procurement source information including a supplier that is a procurement source of electricity desired by the demander; acquires a supplied amount of electricity transmitted to a predetermined electric power network, from electricity generated by a power generation apparatus; causes a quantity of tokens corresponding to the supplied amount to be transmitted from the operator account to the supplier account; acquires a demanded amount of electricity received by the demander from the supplier via the electric power network; calculates the supplier, the demander, and a transmitted amount of electricity transmitted from the supplier to the demander, based on the supplied amount, the demanded amount, and the procurement source information; and causes a quantity of tokens corresponding to the transmitted amount to be transmitted from the corresponding supplier account to the demander account.

SUMMARY

Incidentally, with increasingly widespread use of vehicles equipped with a large-capacity storage battery, such as electric vehicles and hybrid electric vehicles (hereinafter, collectively referred to as "electrically driven vehicles"), use of electrically driven vehicles for electricity storage means has been proposed, and is being put into practice. In actuality, as in JP 2012-196028 A described above, during a period when the amount of electricity consumed by an in-factory load on the in-factory facility is the largest, a shortfall in electricity can be compensated for by instructing an electrically driven vehicle to connect the battery to an in-factory electric power line and to have the battery discharge electricity. Since an electrically driven vehicle can move to any place at the discretion of an owner, and can charge or discharge electricity there, it is useful if a general individual or corporate person can sell and buy electricity in a P2P electricity transaction as described above, by using an electrically driven vehicle.

As described above, when P2P transactions of selling and buying electricity are conducted by using mobile objects such as electrically driven vehicles, conceivable market forms include a "general transaction market" and a "direct transaction market". The "general transaction market" is a market on which contracts are executed for electricity that is supplied from an electricity seller to a buyer through an electric power line of a grid-electricity network (an electric power grid for supplying electricity from a large-scale power plant operated by an electric power company), and the "direct transaction market" is a market on which contracts are executed for a case where one of parties of an electricity transaction moves a mobile object such as an electrically driven vehicle to a place of the other party and electricity transmission is directly performed between the parties. Regarding such forms of the electricity transaction market, when an electricity demander or an owner of a mobile object buys electricity, it is very useful, in order for the electricity demander or the owner of the mobile object buying electricity to reduce an electricity cost, if electricity can be procured through a direct transaction market, without using an electric power line of the grid-electricity network, because no wheeling charge for use of the electric power line is incurred. Moreover, when an electricity demander owns a facility for electricity generation from renewable energy, such as solar-powered electricity generation or wind-powered electricity generation, and sells electricity obtained by the facility, it is advantageous if the electricity can be supplied through a direct transaction market, without using an electric power line of the grid-electricity network, because a mobile object receiving the electricity incurs no wheeling charge for use of the electric power line, it is therefore more easier for the mobile object to buy electricity, and hence it is more easier for the electricity demander to enter into a contract for sale of the electricity. As described above, an electricity transaction through a direct transaction market is useful to both an electricity demander and a mobile object. Accordingly, if a mobile object is configured to be able to perceive, by predicting, being notified, or the like, information such as a timing when an electricity demander attempts to conduct a transaction of selling or buying electricity through a direct transaction market and a bid-offer condition used in the transaction, and to determine, based on the information, a condition for a bid or an offer to be placed on the market, opportunities increase where an electricity transaction through a direct transaction market can be efficiently used, and it is possible to achieve both cost minimization, or profit maximization, in an electricity transaction on the mobile object side, and utilization of renewable energy on the electricity demander side.

Accordingly, an objective of the present disclosure is to provide a configuration that, in a P2P electricity transaction, allows a mobile object such as an electrically driven vehicle to take into consideration a cost in a transaction of selling and buying electricity, and to participate in a transaction with a more advantageous condition.

Another objective of the present disclosure is to provide a configuration that, in a P2P electricity transaction, enables renewable energy to be more effectively utilized by an electricity demander, while allowing a mobile object such as an electrically driven vehicle to minimize an electricity cost.

Still another objective of the present disclosure is to provide a configuration that allows a mobile object such as an electrically driven vehicle to take into consideration a cost or a merit in a transaction of selling and buying electricity, based on a status of use of a direct transaction market by an electricity demander, and to determine whether or not to place a bid or an offer on the direct transaction market of electricity.

According to an aspect of the present disclosure, the objectives can be achieved by an apparatus, for a mobile object, that determines a bid-offer condition for a transaction of selling and buying an amount of electricity on at least one electricity transaction market, including: an electricity amount sell-buy price acquisition section that acquires information on sell and buy prices for an amount of electricity in each of unit time periods on each electricity transaction market;

a charge-discharge optimization section that determines, for each of the unit time periods, an electricity transaction market, a sell or buy price, and an amount of electricity to be charged into or discharged from a storage battery of the mobile object in an optimal condition, by detecting the optimal condition that maximizes a profit or minimizes a loss in terms of an index value, which represents a profit gained or a loss incurred from selling or buying of the amount of electricity by the mobile object on the electricity transaction market, within ranges of dischargeable and chargeable amounts of electricity of the storage battery of the mobile object over at least one of the unit time periods, based on the information on the sell and buy prices for the amount of electricity acquired by the electricity amount sell-buy price acquisition section;

and a bid-offer condition determination section that determines, as the bid-offer condition on the at least one electricity transaction market, for each of the unit time periods, to place an offer or a bid on the electricity transaction market determined by the charge-discharge optimization section, at the sell or buy price and for the amount of electricity to be discharged or charged determined by the charge-discharge optimization section, wherein for the at least one electricity transaction market, a direct transaction market can be selected, on which a contract is executed for an electricity transaction in which electricity is transmitted directly between the mobile object and an electricity demander, and the electricity amount sell-buy price acquisition section is configured to acquire, as the sell and buy prices for the amount of electricity, a sell or buy price for the amount of electricity in each of the unit time periods presented by the electricity demander on the direct transaction market.

In the configuration, the "mobile object" may be a vehicle such as an electrically driven vehicle, such as an electric vehicle or a hybrid electric vehicle, or any other mobile object, on which an externally chargeable and dischargeable storage battery is mounted. The "electricity transaction market" here may be a market on which a mobile object can conduct a transaction of selling and buying electricity by placing a bid or an offer, and may include, as described above, a general transaction market on which a contract is executed for electricity that is supplied from an electricity seller to a buyer through an electric power line of the grid-electricity network, and a direct transaction market on which a contract is executed for a case where one of parties of an electricity transaction moves a mobile object such as an electrically driven vehicle to a place of the other party and electricity transmission is directly performed between the parties. In the apparatus according to the present disclosure, the number of electricity transaction markets that can be selected as a destination of the bid or offer of the mobile object may be one or more. For the "bid-offer condition for a transaction of selling and buying an amount of electricity", a time period in which electricity procurement or supply is conducted, an amount of electricity in each unit time period over the time period, and a sell or buy price in each unit time period for procurement or supply of the amount of electricity (in the present description, the term "price" may be a price for a unit amount of electricity or a price for an amount of electricity to be traded, unless otherwise stated) are included in the condition, and a contract for an electricity transaction is executed on a market when a bid-offer condition of an electricity seller and a bid-offer condition of an electricity buyer approximately match (the "unit time period" indicates one of time periods obtained by dividing a time duration for which electricity procurement or supply is conducted, into parts each with a predetermined time length set on an electricity transaction market; currently in Japan, since 24 hours are divided into 48 parts, the length of one unit time period is 30 minutes). The "sell and buy prices for an amount of electricity in each of unit time periods on each electricity transaction market" are sell and buy prices for the amount of electricity offered by sellers and bid by buyers on at least one electricity transaction market, generally a plurality of electricity transaction markets, that can be a bid-offer destination, and the "electricity amount sell-buy price acquisition section" is a section that acquires information on the sell and buy prices for the amount of electricity on the at least one electricity transaction market by using an arbitrary method, for example, any one of methods described later as examples. Acquired values of the sell and buy prices may be values that vary by electricity transaction market and unit time period.

In the configuration of the apparatus, the "charge-discharge optimization section", as described above, detects an optimal condition that maximizes a profit or minimizes a loss (cost) in terms of the index value, which represents a profit gained or a loss incurred by the mobile object from selling or buying of the amount of electricity on an electricity transaction market, within ranges of dischargeable and chargeable amounts of electricity of the storage battery of the mobile object over at least one unit time period, based on the "information on the sell and buy prices for the amount of electricity". Here, the "ranges of dischargeable and chargeable amounts of electricity of the storage battery of the mobile object" is a dischargeable amount of electricity and a chargeable amount of electricity depending on a capacity and an amount of stored electricity of the storage battery of the mobile object. In other words, the range of the dischargeable amount of electricity is amounts of electricity ranging from an amount of electricity stored in the storage battery to a lower limit of State Of Charge (SOC), and the range of the chargeable amount of electricity is amounts of electricity ranging from an amount of electricity stored in the storage battery to an upper limit of SOC. The ranges of the dischargeable and chargeable amounts of electricity may be determined, with an amount of electricity required for use, such as movement of the mobile object, taken into consideration. "A profit gained or a loss incurred from selling or buying of the amount of electricity" is a profit gained or a loss incurred from an electricity transaction and, more specifically, may be a profit or a loss that is a quantity obtained by multiplying a sell or buy amount of electricity by a sell or buy price. On the condition that one electricity transaction market is selected at a time, the charge-discharge optimization section searches for an optimal condition that maximizes a profit (or minimizes a loss) over at least one time period, by calculating "a profit gained or a loss incurred from selling or buying of the amount of electricity" while variously changing an amount of electricity to be sold or bought at each of the acquired sell and buy prices in each unit time period on each electricity transaction market, and thus determines an electricity transaction market, a sell or buy price, and an amount of electricity to be discharged from or charged into the storage battery of the mobile object in each time period in the optimal condition.

In the configuration of the apparatus according to the present disclosure, particularly when a direct transaction market is included in the at least one electricity transaction market, information on a sell or buy price for the amount of electricity in each time period presented by an electricity demander on the direct transaction market is acquired. Here, the "electricity demander" may be an individual person, a facility, or the like that demands electricity, and more specifically may be a facility that consumes electricity on a small or medium scale, such as a home or a shop, or may be a large-scale electricity consumer that consumes a large amount of electricity, such as a factory, a commercial facility, a rail station, or an airport. The "sell or buy price for the amount of electricity" in the present case is a price presented when the electricity demander places a bid to buy electricity from a mobile object or an offer to sell electricity to a mobile object.

Accordingly, in the configuration of the apparatus according to the present disclosure, when the mobile object places a bid or an offer for an electricity transaction on an electricity transaction market, the charge-discharge optimization section refers to the sell and buy prices for the amount of electricity on each electricity transaction market, and finds a bid-offer condition that is an optimal condition that maximizes a profit (or minimizes a loss) for the mobile object. Accordingly, it is expected that an incentive for the electricity transaction is given to an owner of the mobile object. Moreover, when electricity transaction markets that can be selected as a bid-offer destination include a direct transaction market on which a contract is executed for an electricity transaction in which electricity is transmitted directly between the mobile object and an electricity demander without using an electric power line, a sell or buy price presented by the electricity demander on the direct transaction market can be referred to, and the bid-offer condition can be determined such that a profit is maximized or a loss is minimized for the mobile object. Accordingly, the mobile object such as an electrically driven vehicle can determine whether or not to place a bid or an offer on the direct transaction market of electricity, based on a status of use of the direct transaction market by the electricity demander, with a cost or a merit in a transaction of selling and buying electricity taken into consideration. When a direct transaction market is more advantageous to the mobile object than other electricity transaction markets, the mobile object can detect such a fact and place a bid or an offer. Hence, according to the configuration, it is expected that transactions of selling and buying electricity on direct transaction markets are more effectively used, without involving wheeling charges that accompany electricity transmission, and that both cost minimization or profit maximization in electricity transactions for mobile objects and further effective utilization of renewable energy for electricity generation by electricity demanders can be achieved.

In the configuration, since buy and sell prices on the general transaction market are dependent on climate information or date and time information, the electricity amount sell-buy price acquisition section may be configured to acquire, as the sell and buy prices for the amount of electricity in each of the unit time periods on each electricity transaction market, information on sell and buy prices for the amount of electricity in each of the unit time periods on the general transaction market, the sell and buy prices predicted based on climate information or date and time information, and the charge-discharge optimization section may be configured to detect the optimal condition, based on the sell or buy price on the direct transaction market and the sell and buy prices on the general transaction market predicted as described above. Since a sell or buy price presented by an electricity demander on a direct transaction market is generally also dependent on the climate information or the date and time information in many cases, the electricity amount sell-buy price acquisition section may be configured to acquire information on the sell or buy price for the amount of electricity in each of the unit time periods presented by the electricity demander on the direct transaction market, by predicting the sell or buy price based on the climate information or the date and time information. More specifically, the predicted values of the sell and buy prices on the general transaction market or the predicted value of the sell or buy price presented by the electricity demander on the direct transaction market can be determined as appropriate by using an arbitrary algorithm such as machine learning, based on sell and buy prices on the general transaction market or a sell or buy price presented by the electricity demander on the direct transaction market under similar conditions to current or future climate information or date and time information. Moreover, a sell or buy price presented by an electricity demander on a direct transaction market is determined generally according to an amount of electricity demanded by the electricity demander. Accordingly, in the apparatus, a section may be provided that predicts an amount of electricity demanded over at least one of the unit time periods by the electricity demander that places a bid or an offer on the direct transaction market, based on the climate information or the date and time information, and the electricity amount sell-buy price acquisition section may be configured to predict the sell or buy price for the amount of electricity in each of the unit time periods presented by the electricity demander on the direct transaction market, based on the predicted demanded amount of electricity. According to such configurations, the mobile object can determine the bid-offer condition, based on a predicted value of the sell or buy price presented by the electricity demander on the direct transaction market, and, when an electricity transaction on the direct transaction market is advantageous, can advantageously conduct an electricity transaction by seizing such an opportunity. In the embodiment described above, since the sell and buy prices in electricity transactions are predicted based on information that is relatively easily available, such as the climate information or the date and time information, an advantage is brought about that the configuration of a section for collecting the information can be simplified in the apparatus.

In the apparatus according to the present disclosure, as another aspect with respect to the acquisition of information on a sell or buy price presented by an electricity demander on the direct transaction market, the mobile object may be notified from the electricity demander that places a bid or an offer on the direct transaction market, before a bid and an offer are placed, of information on a sell or buy price (or further a desired sell or buy amount of electricity) used when the electricity demander places the bid or offer, and the mobile object may determine the bid-offer condition by referring to the notified sell or buy price. In such a case, preferably, a configuration is made such that when an electricity transaction using the notified sell or buy price is accepted, acceptance of the electricity transaction can be notified to the electricity demander such that the accepted electricity transaction is contracted. Accordingly, the apparatus according to the present disclosure may be provided with: a sell-buy price information notification reception section that receives a notification of the information on the sell or buy price for the amount of electricity presented by the electricity demander on the direct transaction market; and a selling-buying transaction acceptance notification section that, when a transaction of selling and buying electricity using the sell or buy price presented by the electricity demander on the direct transaction market is accepted, transmits a notification of acceptance of the transaction of selling and buying electricity to the electricity demander, and the electricity amount sell-buy price acquisition section may be configured to acquire, as the information on the sell and buy prices in each of the unit time periods on each electricity transaction market, the information on the sell or buy price notified via the sell-buy price information notification reception section, and the selling-buying transaction acceptance notification section may be configured to, when the charge-discharge optimization section detects one of conditions for the transaction of selling and buying electricity using the notified sell or buy price as the optimal condition, transmit a notification of acceptance of the transaction of selling and buying electricity to the electricity demander that presents the sell or buy price in the transaction of selling and buying electricity detected as the optimal condition, after it is confirmed that another transaction of selling and buying electricity is not affected by the transaction of selling and buying electricity using the sell or buy price detected as the optimal condition. Note that a case where "another transaction of selling and buying electricity" is affected by the "transaction of selling and buying electricity using the sell or buy price detected as the optimal condition" is, for example, occurrence of a situation in which electricity cannot be charged into or discharged from the storage battery in another transaction of selling and buying electricity that is already contracted or is likely to be contracted in the future, due to charge or discharge of the storage battery performed in the transaction of selling and buying electricity using the sell or buy price detected as the optimal condition, or the like. If such a situation occurs, the transaction of selling and buying electricity using the sell or buy price detected as the optimal condition cannot be accepted and contracted. Accordingly, the apparatus according to the present disclosure may be configured to make acceptance of the transaction of selling and buying electricity to the electricity demander that presents the sell or buy price, after confirming that another transaction of selling and buying electricity is not affected by the transaction of selling and buying electricity using the sell or buy price detected as the optimal condition. Further, in order for the electricity demander to identify the transaction accepted by the mobile object on the direct transaction market, the bid-offer condition determination section may be configured to, when the selling-buying transaction acceptance notification section transmits the notification of acceptance of the transaction selling and buying electricity to the electricity demander, include, in the bid-offer condition, identification information that allows the electricity demander to identify the accepted transaction of selling and buying electricity.

Incidentally, in an electricity transaction contracted through a direct transaction market, a mobile object moves to a place of an electricity demander and charges or discharges electricity at a charger-discharger facility in the place, and therefore does not incur a wheeling charge for use of an electric power line as described above. However, when the mobile object moves to the place of the electricity demander by deviating from a planned travel route, the mobile object consumes a more amount of electricity to make a detour to the place of the electricity demander than when the mobile object travels along the planned travel route, and consequently incurs another cost. Accordingly, when detecting the optimal condition, the configuration according to the present disclosure, preferably, may also take into consideration an amount of electricity required for the mobile object to make a detour to a place of an electricity demander by deviating from a planned travel route. Hence, the apparatus according to the present disclosure may further include: a travel route prediction section that predicts a future travel route of the mobile object; and a detour loss calculation section that, when a charger-discharger facility of the electricity demander that places a bid or an offer on the direct transaction market selected as the at least one electricity transaction market does not exist on the predicted future travel route, calculates a detour loss that is a loss required to make a detour to the charger-discharger facility of the electricity demander that places a bid or an offer on the selected direct transaction market, and the charge-discharge optimization section may be configured to detect, as the optimal condition, the condition that maximizes a profit or minimizes a loss, with the detour loss included in the profit gained or the loss incurred from selling or buying the amount of electricity on the electricity transaction market. Thus, the profit or loss from selling or buying of the amount of electricity on the electricity transaction market can be evaluated with higher accuracy. Note that the detour loss may be a value obtained by multiplying an amount of electricity required to make a detour to the electricity demander by a typical price of electricity (price per unit amount of electricity). For the typical price (price per unit amount of electricity), for example, a price of electricity sold by an electric power company, an average of prices of electricity bought by the mobile object (during a predetermined time period), or the like may be selected.

Communication of information between the bid-offer condition determination apparatus for mobile object according to the present disclosure and the outside world (electricity transaction market, electricity demander) may be achieved through an arbitrary wireless or wired communication network. A configuration of, and processing such as computational operations at, each section in the apparatus may be implemented by operation according to a program on a computer apparatus.

According to the apparatus of the present disclosure, in a P2P electricity transaction, opportunities for electricity transactions through direct transaction markets between mobile objects such as electrically driven vehicles and electricity demanders are increased, and it is expected that utilization of renewable energy by electricity demanders is promoted, while each mobile object maximizes a benefit in terms of a profit or a loss from a transaction. As mentioned already, an electricity transaction through a direct transaction market has an advantage that no wheeling charge is incurred because an electric power line is not used, so that an electricity buyer can reduce a cost required in the electricity transaction. Moreover, since a chance of an electricity transaction through an advantageous direct transaction market can be detected on the mobile object side, it is expected that mobile objects can more advantageously participate in electricity transactions, so that the mobile object side can enjoy benefits, and such benefits may incentivize mobile objects to conduct electricity transactions.

Other objectives and advantages of the present disclosure will become clear through a following description of preferred embodiments of the present disclosure.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 2B is a diagram for describing an aspect of bidding and offering on a general transaction market in a P2P electricity transaction;

FIG. 2C is a diagram for describing an aspect of bidding and offering on a direct transaction market in a P2P electricity transaction;

FIG. 7A is a schematic diagram for describing a cost required to make a detour to a place of an electricity demander; and FIG. 7B shows, in a form of a block diagram, a configuration in a third aspect of the bid-offer condition determination apparatus for mobile object (electrically driven vehicle) according to the embodiment, configured to take into consideration a cost incurred when a detour to a place of an electricity demander is made in travel.

DETAILED DESCRIPTION OF EMBODIMENTS

Hereinafter, some preferred embodiments of the present disclosure will be described in detail with reference to the accompanying drawings. Throughout the drawings, like signs denote like elements.

Configuration of Electricity Transmission and Distribution System

Figure 1:
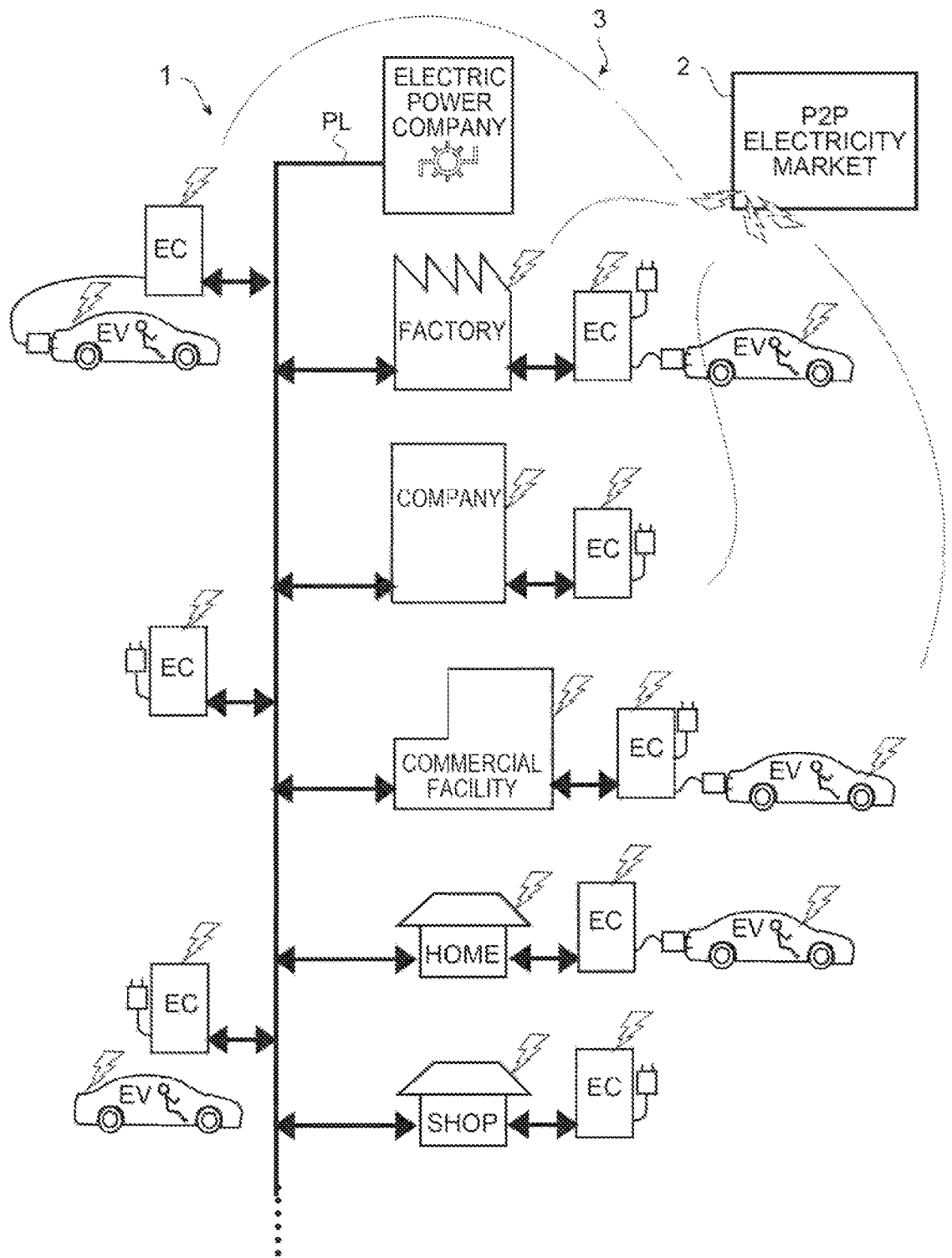
FIG. 1 schematically depicts an electricity transmission and distribution system for electricity that is traded on a P2P electricity transaction market to which an embodiment is applied.

As schematically shown in FIG. 1, in an electricity transmission and distribution system 1, as distributed power supplies have become widely available owing to the liberalization of electricity and technologies for generating electricity from renewable energy, introduction of P2P electricity selling and buying transactions, that is, introduction of transactions of selling and buying electricity between individuals has been considered and, technically, is becoming feasible, although, previously, electricity was supplied exclusively from a power plant managed by an electric power company through a power grid PL (grid-electricity network) laid up to various facilities and buildings that consume or use electricity, for example, various electricity demanders such as factories, buildings (business operators such as companies), commercial facilities, homes, and shops. Moreover, in the electricity transmission and distribution system 1, with the increasingly widespread use of mobile objects such as electrically driven vehicles EV equipped with large-capacity storage batteries, such as electric vehicles and hybrid electric vehicles, charger-discharger facilities EC are installed at various places on the power grid PL and in electricity demanders, and an electrically driven vehicle EV can connect to such a charger-discharger facility EC and charge or discharge the storage battery. Further, since a charger-discharger facility EC can be installed in a facility of an electricity demander, supply of electricity from an electrically driven vehicle EV to the electricity demander, or reception of electricity by an electrically driven vehicle EV from the electricity demander, can be performed via the power grid PL, and can also be directly performed through the charger-discharger facility EC installed at the electricity demander. Accordingly, it is possible to supply electricity generated based on renewable energy electricity generation technologies, such as solar-powered electricity generation or wind-powered electricity generation, directly from an electricity demander to a mobile object such as an electrically driven vehicle, or to supply electricity generated or stored by a mobile object directly to an electricity demander. Use of an electrically driven vehicle EV for electricity storage means has been proposed and is being put into practice, and it is also considered to sell and buy electricity by using a mobile object such as an electrically driven vehicle EV through a P2P transaction.

In a system in which a P2P electricity selling and buying transaction is conducted between electricity demanders including mobile objects such as electrically driven vehicles EV, each electrically driven vehicle EV and each electricity demander is provided with a processing device (computer) including: a communication function capable of communicating information, via a communication network 3 (typically, the communication function may be capable of communication through a wireless communication network in case of a mobile object such as an electrically driven vehicle EV, and through a wired or wireless communication network in case of an electricity demander located at a fixed place such as a facility), with an information processing system (server) 2 that executes a P2P electricity selling and buying transaction; and a function of accessing a market for P2P electricity selling and buying transactions, which is configured on the system 2, and enabling a bid to buy or an offer to sell electricity to be placed. To put it simply, when any of the mobile objects such as the electrically driven vehicles EV and the electricity demanders desires a transaction to sell or buy electricity, the electrically driven vehicle EV or the electricity demander places an offer or a bid on a market where the electrically driven vehicle EV or the electricity demander desires to conduct the transaction of selling and buying electricity, according to a bid-offer condition including a time period in which the electrically driven vehicle EV or the electricity demander desires to sell or buy electricity, as well as a desired sell or buy amount of electricity and a sell or buy price in each unit time period. An operator of the market for P2P electricity selling and buying transactions issues a contract for a transaction of selling and buying electricity between a seller and a buyer that have matching bid-offer conditions, based on an arbitrary algorithm, and handles an offer or a bid for which a matching condition cannot be found as "nothing done". Note that each of the charger-discharger facilities EC at various places may be configured to transmit information on a use state of the charger-discharger facility (usability, occupied or not, an amount of electricity increased or decreased through a charge or discharge conducted, and the like) to the information processing system, whereby it is notified to each mobile object such as an electrically driven vehicle EV which charger-discharger facility EC is available.

Configuration of P2P Electricity Selling and Buying Transaction System

Figure 2A:
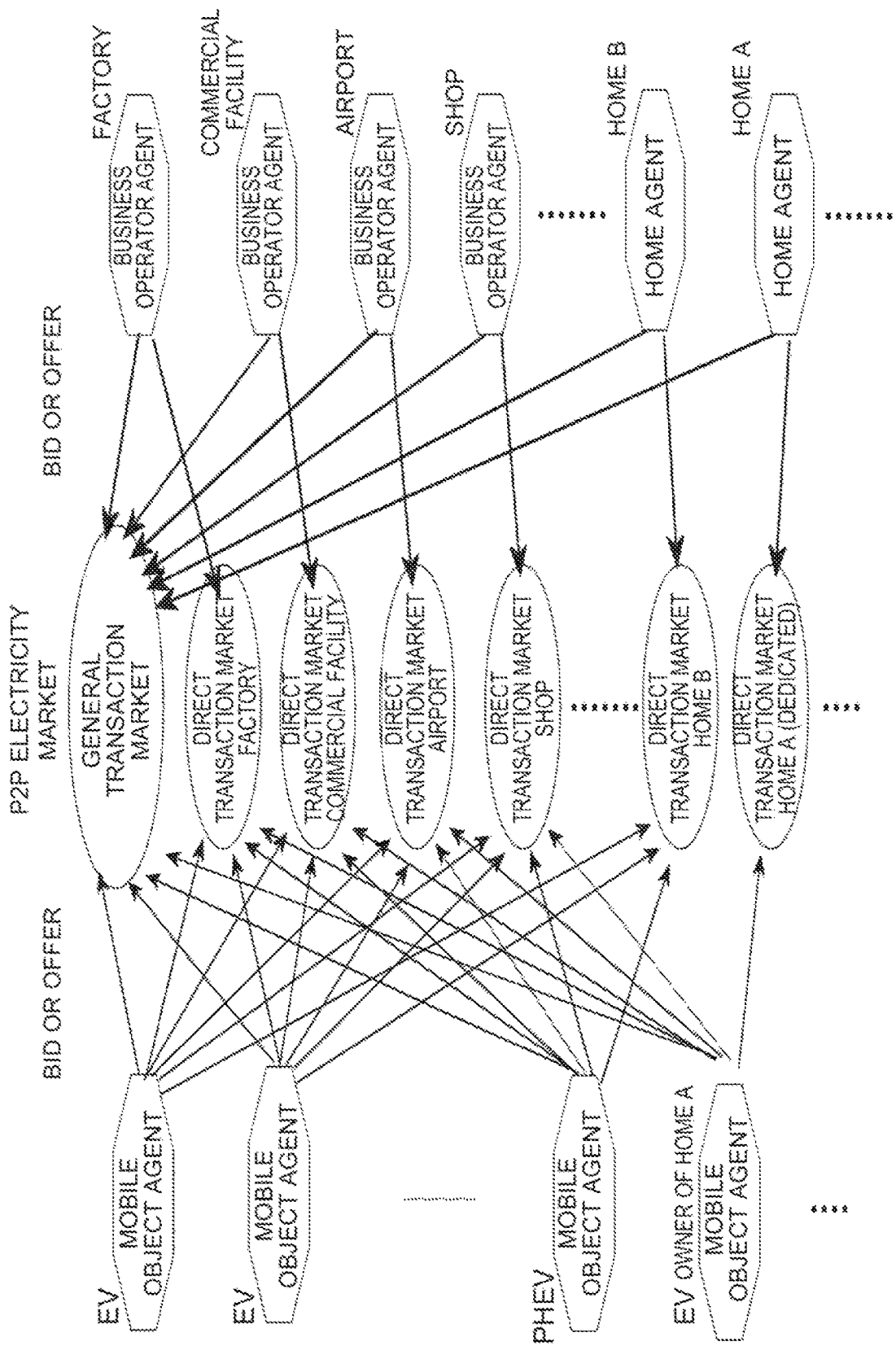
FIG. 2A schematically depicts a configuration of a system of the P2P electricity transaction market.

Various forms are considered for the P2P electricity selling and buying transaction system. In one form, as depicted in FIG. 2A, business operator agents, home agents, and mobile object (vehicle) agents exist in the system. The business operator agents respectively manage bids or offers and contracts of large electricity demanders demanding large amounts of electricity, such as relatively large-scale facilities including, for example, a factory, a commercial facility, a rail station, an airport, and the like. The home agents respectively manage bids or offers and contracts of small electricity demanders demanding an ordinary, small amount of electricity, such as homes and small- and medium-sized shops. The mobile object (vehicle) agents respectively manage bids or offers and contracts of mobile objects such as electrically driven vehicles EV. Each of the electrically driven vehicles EV, the large electricity demanders, and the small electricity demanders places a bid or an offer via the corresponding agent in charge.

Electricity traded through a P2P electricity selling and buying transaction market is transmitted through the power grid PL between electricity demanders, for which places to receive or supply electricity bid or offered via a business operator agent or a home agent are fixed. When a mobile object such as an electrically driven vehicle EV participates in a transaction, the mobile object can move to a charger-discharger facility EC at an electricity demander and directly receive or supply electricity, as described with reference to FIG. 1. Accordingly, for P2P electricity selling and buying transaction markets in which mobile objects such as electrically driven vehicles EV participate, a "general transaction market", on which a contract is executed for a transaction of electricity that is transmitted via the power grid PL between electricity demanders, and a "direct transaction market", on which a contract is executed for an electricity transaction in which a mobile object moves to a premise (into a facility) of an electricity demander and receives or supplies electricity, are configured. Since mobile objects can transmit electricity via any charger-discharger facility EC connected to the power grid PL, the mobile objects can also conduct an electricity transaction on the general transaction market. Regarding such transaction markets, as shown in FIG. 2A, on the general transaction market, bids and offers are received from a plurality of mobile objects and electricity demanders via the business operator agents, the home agents, and the vehicle agents, and a contract is executed for an offer and a bid placed by a seller and a buyer that have matching bid-offer conditions. In other words, as schematically depicted in FIG. 2B, a plurality of buyers and sellers place bids (p, q) and offers (P, Q), which are combinations of a price and an amount of electricity, in each unit time period (1, 2, . . . , n). The unit time period is a time width (generally, 30 minutes) set on a market, and a transaction of an amount of electricity is conducted for each amount of electricity transmitted within the unit time period (electric power×length of a unit time period). As for the direct transaction market, as shown in FIG. 2A, one market is configured for a fixed electricity demander at which a charger-discharger facility EC is installed. Such direct transaction markets may be individually configured on respective servers managed by the electricity demanders as shown in FIG. 2A, or a plurality of direct transaction markets may be collectively configured on a server (not shown). On each of the direct transaction markets, as shown in FIG. 2C, one demander places a bid or an offer in each unit time period (1, 2, . . . , n), offers or bids in each unit time period (1, 2, . . . , n) are accepted from a plurality of mobile objects, and a contract is executed for a bid and an offer that have matching conditions. Note that there are some cases where an owner of a mobile object is identical to an owner of a home, and in such a case, a configuration may be made such that the owners may separately place an offer or a bid by the mobile object and a bid or an offer by the home (for example, there may be cases where an owner opens a market dedicated to a mobile object owned by the owner, without allowing public access to a charger-discharger, like a home A in FIG. 2A).

Configuration and Operation of Bid-Offer Condition Determination Apparatus for Mobile Object Such as Electrically Driven Vehicle (a) Outline According to the present embodiment, to put it simply, opportunities are increased for mobile objects such as electrically driven vehicles to place offers and bids on P2P electricity selling and buying transaction markets that allow electricity demanders, such as individual and corporate persons, to conduct electricity transactions as described above, whereby mobile objects are encouraged to more actively participate in P2P electricity transactions, and both utilization of mobile objects in electricity transactions and utilization of renewable energy by electricity demanders are thus promoted. To this end, in the present embodiment, an apparatus is provided that can search for a condition that is advantageous to a mobile object in a P2P electricity transaction, and that, based on the advantageous condition, determines a condition for a bid or an offer to be placed on an electricity transaction market such that the mobile object can gain as large a profit as possible, or reduce a loss as much as possible, from an electricity transaction. In this respect, as mentioned in "SUMMARY", there are a "general transaction" and a "direct transaction", as forms of an electricity transaction that a mobile object conducts. The direct transaction, in which a mobile object moves to a place of an electricity demander and electricity transmission is performed by using a charger-discharger facility installed at the electricity demander, is advantageous because a wheeling charge (or a wheeling fee) is not incurred, which an electricity buyer needs to pay to an electric power line management company in case of the general transaction, in which electricity transmission is performed through the power grid, and a cost in the electricity transaction can be restrained accordingly. However, there may be cases, depending on a circumstance, where an electricity transaction through the general transaction market is more advantageous due to fluctuations in buy and sell prices, even if the wheeling charge is taken into consideration. Accordingly, the apparatus in the present embodiment enables a mobile object to: acquire information on sell and buy prices for an amount of electricity on each of electricity transaction markets, including a sell or buy price presented by an electricity demander on a direct transaction market, by using any of some methods as described below; calculate, based on the information, an index value, which represents a profit gained or a loss incurred by the mobile object from selling or buying of the amount of electricity on each of the electricity transaction markets, within ranges of dischargeable and chargeable amounts of electricity of a storage battery of the mobile object; detect an optimal condition that maximizes a profit or minimizes a loss; and, based on the optimal condition, place an offer or a bid on a direct transaction market that gives the optimal condition, at a sell or buy price and for a desired sell or buy amount of electricity in the optimal condition, as a bid-offer condition.

In the configuration, since particularly the sell or buy price presented by the electricity demander on the direct transaction market varies with increases and decreases in electricity demand or increases and decreases in surplus electricity at the electricity demander, the sell or buy price presented by the electricity demander on the direct transaction market becomes relatively high, compared to other markets, when electricity demand at the electricity demander is increasing, or the sell or buy price presented by the electricity demander on the direct transaction market becomes relatively low, compared to other markets, when surplus electricity at the electricity demander is increasing, and therefore a transaction on the direct transaction market can easily be detected as the optimal condition. Consequently, electricity is supplied from the mobile object to an electricity demander with high electricity demand, or is supplied from an electricity demander with large surplus electricity to the mobile object, and is exchanged for a consideration. Accordingly, the apparatus in the present embodiment can contribute to optimization of an electricity transaction for an electricity demander, such as a home and a community, in addition to optimization of an electricity transaction for the mobile object. In other words, since a mobile object can move to and discharge electricity at a place in great need of electricity, or move to and charge electricity at a place with a surplus of electricity generated by solar power, the mobile object can, while placing higher priority on an own economic benefit, enhance a rate of use of renewable energy and economic efficiency of a community.

In the configuration of the bid-offer condition determination apparatus that determines a bid-offer condition for an electricity transaction of a mobile object such as an electrically driven vehicle according to the present embodiment, to put it generally, a configuration is provided that: acquires information on sell and buy prices on the general transaction market and a sell or buy price of an electricity demander on a direct transaction market; searches, based on the information, for an optimal condition including a transaction market, a sell or buy price, and an amount of electricity in each unit time period that maximize a profit or minimizes a loss from an electricity transaction; and uses the found transaction market, sell or buy price, and amount of electricity for a bid-offer condition. A configuration and operation of each section of the bid-offer condition determination apparatus may be implemented by operations according to a program of a computer apparatus provided for the mobile object. The computer apparatus may include a computer and a drive circuit. The computer includes a CPU, a ROM, a RAM, and an input-output port device mutually coupled through a bidirectional common bus in an ordinary form. The bid-offer condition determination apparatus may be configured on a computer apparatus provided to the mobile object, or may be configured by using cloud computing.

(b) Acquisition of Buy and Sell Prices Through Prediction

According to a configuration in an aspect (first aspect) of the apparatus that determines a bid-offer condition for an electricity transaction of a mobile object, the information on the buy and sell prices on the electricity transaction markets is acquired by predicting the buy and sell prices on the electricity transaction markets by using climate information or date and time information. Specifically, referring to FIG. 3, an internally stored data collection section and an externally acquired data collection section are provided in the first aspect. The internally stored data collection section collects internal information on the mobile object, such as travel and operation data (trip information) on the mobile object such as an electrically driven vehicle from the past to the present, data on changes in SOC of the storage battery, and data on a state of connection to a charger-discharger at home or office. The externally acquired data collection section acquires external information, including climate information such as weather and atmospheric temperatures, dates and times, past asked prices on electricity transaction markets, and the like. Based on the information acquired by the internally stored data collection section, a user usage prediction section predicts future usage of the mobile object, such as future travel data, a place of connection, and a duration of stop, in an arbitrary manner, and an amount of electricity $q_{trip}$ to be consumed by the mobile object may be estimated based on the predicted information.

Figure 3:
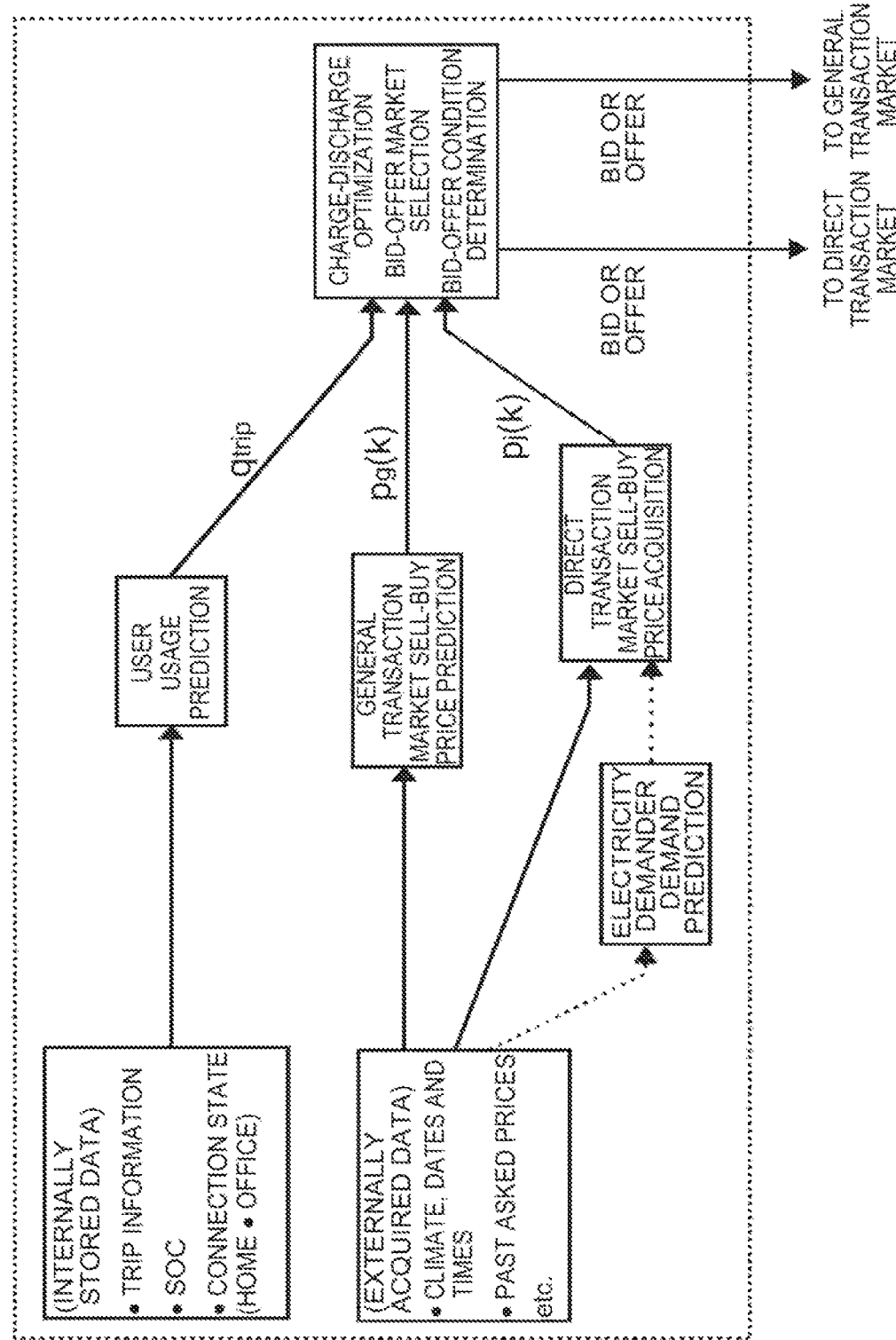
FIG. 3 shows, in a form of a block diagram, a configuration in a first aspect of a bid-offer condition determination apparatus for mobile object (electrically driven vehicle) according to the embodiment.

On the other hand, the information acquired by the externally acquired data collection section is used to predict buy and sell prices on the general transaction market and buy and sell prices on direct transaction markets. As mentioned earlier, buy and sell prices of electricity vary with electricity demand that changes from time to time, and electricity demand is generally dependent on weather, dates and times (holidays, weekdays, presence or absence of an event), and the like. Accordingly, buy and sell prices on markets from the present into the future can be predicted by acquiring information on a weather or a date and a time (holiday, weekday, presence or absence of an event) at the present or in the future, and by checking, for comparison, data on past demand, electricity prices on the markets, or the like in a similar weather or at a similar time on a similar date (holiday, weekday, presence or absence of an event) in the past. Hence, for the buy and sell prices on the general transaction market, a general transaction market price prediction section may: refer to the information acquired by the externally acquired data collection section; check, for comparison, data on past weather, dates and times (holidays, weekdays, presence or absence of an event), past demand, past electricity prices on the general transaction market, and the like; and determine, in an arbitrary manner, predicted values of future buy and sell prices of electricity on the general electricity transaction market (a predicted value of the price may be determined for each unit time period on the market). For the buy and sell prices on direct transaction markets, a direct transaction market sell-buy price acquisition section may: refer to the information acquired by the externally acquired data collection section; check, for comparison, data on past weather, dates and times (holidays, weekdays, presence or absence of an event), contracted prices on each of direct transaction markets on which a plurality of electricity demanders respectively place a bid or an offer, and the like; and determine, in an arbitrary manner, predicted values of sell and buy prices of electricity on each direct transaction market from the present into the future (a predicted value of the price may be determined for each unit time period on each market). A direct transaction market on which the buy and sell prices are predicted may be arbitrarily selected, based on a positional relationship between the mobile object and each electricity demander that places a bid or an offer on one of the direct transaction markets, from among markets on which a bid or an offer is placed by electricity demanders existing within a range where the mobile object can procure or supply electricity (for example, on a planned travel route of the mobile object, or the like). Since a buy or sell price on each direct transaction market is dependent on electricity demand at each electricity demander, as shown in FIG. 3, an electricity demander demand prediction section may predict an amount of electricity demanded by an electricity demander over at least one unit time period based on the information acquired by the externally acquired data collection section, and a predicted value of a buy or sell price may be determined according to the predicted demanded amount of electricity.

(c) Processing of Optimizing Charge-Discharge Condition

When the information on the sell and buy prices on each market is thus acquired, a search is performed for an optimal bid-offer condition that maximizes a profit or minimizes a loss for the mobile object, by using the acquired information on the sell and buy prices on each transaction market. In the processing, an objective function $f_{cost}$ that calculates a cost incurred in a transaction of selling and buying electricity is set as an index value indicating a profit or a loss in the transaction of selling and buying electricity, and a sell or buy amount of electricity that minimizes the objective function $f_{cost}$ is searched for, under a constraint condition regarding upper and lower limits of SOC that need to be satisfied for the storage battery of the mobile object (within the chargeable and dischargeable ranges of the storage battery).

Specifically, first, the objective function $F_{cost}$ may be set as follows:

[Expression 1]

$$f_{cos\,t}(i, n) = \sum_{k=i}^{i+n}\left\{r_{connect}(k)\cdot F_g(k) + \sum_{j}^{m} u_{connect}^j(k)F_j(k)\right\} \quad (1)$$

where k (=i to (i+n) where i is a current unit time period) is a sign representing a unit time period, $r_{connect}(k)$ is a variable that is 1 when the mobile object supplies or procures electricity through the general transaction market (is connected to a charger-discharger facility connected to the power grid) in a unit time period k, and otherwise 0, j is a sign representing an electricity demander that places a bid or an offer on a direct transaction market, and $u_{connect}^i(k)$ is a variable that is 1 when the mobile object supplies or procures electricity through a direct transaction market on which an electricity demander j places a bid or an offer (is connected to a charger-discharger facility of the electricity demander j) in a unit time period k, and otherwise 0. $F_g(k)$ is a cost incurred when the mobile object supplies or procures electricity through the general transaction market in a unit time period k, and is given by a following expression:

[Expression 2]

$$F_g(k)=q_{buy}(k)\cdot(P_g(k)+\delta)-q_{sell}(k)\cdot P_g(k) \quad (2)$$

where $P_g(k)$ is a predicted value of a sell or buy price (per unit amount of electricity) on the general transaction market in a unit time period k, $q_{buy}(k)$, $q_{sell}(k)$ are a desired buy amount of electricity and a desired sell amount of electricity in a unit time period k, respectively, and δ is an additional wheeling charge. The wheeling charge, as described already, is paid to a manager of the power grid according to an amount of electricity as a fee for use of the power grid when the mobile object buys electricity through the power grid, and is therefore added according to the amount of electricity as described above to a cost incurred when electricity is procured or supplied through the general transaction market. $F_j(k)$ is a cost incurred when the mobile object supplies or procures electricity through a direct transaction market on which an electricity demander j places a bid or an offer in a unit time period k, and is given by a following expression:

[Expression 3]

$$F_j(k) = P_j(k)(q_{buy}(k) - q_{sell}(k)) \quad (3)$$

where $P_j(k)$ is a predicted value of a sell or buy price (per unit amount of electricity) on the direct transaction market of the electricity demander j in a unit time period k, and $q_{buy}(k)$, $q_{sell}(k)$ are a desired buy amount of electricity and a desired sell amount of electricity in a unit time period k, respectively. As described already, in procurement or supply of electricity through a direct transaction market, no wheeling charge is incurred because the power grid is not used.

The SOC of the storage battery of the mobile object is given by a following expression:

[Expression 4]

$$SOC(i, n) = SOC(i) + \sum_{k=i}^{i+n}(q_{buy}(k) - q_{sell}(k) - q_{trip}(k))/C \quad (4)$$

where $q_{trip}(k)$ is a predicted value of an amount of electricity consumed by the mobile object for traveling in a unit time period k, which is acquired from the user usage prediction section, and C is a conversion factor for converting an amount of electricity into SOC. For SOC, an upper limit $SOC_{UpperLimit}$ and a lower limit $SOC_{LowerLimit}$ are set, and it is a constraint condition that SOC satisfies a following expression:

$$SOC_{LowerLimit} \leq SOC(k) \leq SOC_{UpperLimit} \quad (5).$$

Thus, by using each predicted value of the sell or buy price on the general transaction market and each predicted value of the sell or buy price on the direct transaction market of each electricity demander for Pg(k), Pj(k), respectively, in the objective function $f_{cost}$, a condition that minimizes the objective function $f_{cost}$ is searched for (optimization of the objective function) by variously changing the values of $q_{buy}(k)$, $q_{sell}(k)$ while expression (5) is satisfied, under a condition that the storage battery of the mobile object is connected to a charger-discharger facility on one place at a time (only one of $r_{connect}(k)$ and $u_{connect}^i(k)$ is 1 and the other is 0 in a unit time period k), and a condition regarding the upper limits of the bid or offer amount of electricity previously described. For the optimization processing, processing using any numerical operations may be used, such as linear programing or convex optimization.

When the processing for optimization of the objective function is performed and optimal conditions are detected as described above, then for each unit time period, a transaction market corresponding to $r_{connect}(k)$ or $u_{connect}^i(k)$ that indicates "1" in an optimal condition is selected as a bid-offer destination, and a predicted value of the price used in the optimal condition and a desired buy amount of electricity or a desired sell amount of electricity found for the optimal condition are determined as a bid-offer condition, and an offer or a bid is placed in each unit time period. According to the configuration, the mobile object, when selling electricity, places an offer on a market where the predicted buy and sell prices are high, among the general transaction market and the direct transaction markets, and, when buying electricity, places a bid on a market where the predicted buy and sell prices are low, among the general transaction market and the direct transaction markets. When a contract is executed for an offer or a bid on the general transaction market, the mobile object supplies or receives electricity at a charger-discharger facility EC installed on the power grid PL. To transmit a contracted amount of electricity via the power grid PL, a method for ensuring traceability in electricity transmission is introduced on the market. When a contract is executed for an offer or a bid on a direct transaction market, the mobile object discharges or charges a sold or bought amount of electricity at a charger-discharger facility installed at an electricity demander that is the other party of the contract executed on the market.

In the configuration, on each direct transaction market, it is thought that when an electricity demander places a bid, the highness of a buy price accords with the magnitude of a degree of tightness of electricity demand at the electricity demander that places the bid on the direct transaction market, and that when an electricity demander places an offer, the lowness of a sell price accords with the magnitude of surplus electricity occurring at the electricity demander that places the offer on the direct transaction market. Accordingly, according to the configuration, electricity is sold to or bought from a place in most serious difficulty in a region. Moreover, since supply and procurement of electricity contracted through a direct transaction market are performed within the same premise of an electricity demander, and transport of the electricity is performed by a mobile object without using the power grid, a transaction involving no wheeling charge can be conducted, so that a cost reduction can be achieved, and loads on the power grid can also be reduced.

In the configuration of the present embodiment, although not shown in the drawings, the charge-discharge optimization processing may be configured further such that a result of a bid or an offer is referred to, charge-discharge optimization processing is repeated, and the optimal condition is updated. Specifically, when a contract is executed for a bid or an offer, the mobile object may correct parameters used in the objective function, such as a market selected as a bid-offer destination or predicted values of the prices, while taking into consideration a duration of electricity transmission and an amount of electricity to be transmitted for the duration in the contract, perform the charge-discharge optimization processing again, and perform a search for a new optimal condition and determination of a bid-offer condition. Even when a contract is not executed for a bid or an offer, the mobile object may correct the parameters used in the objective function, such as a market selected as a bid-offer destination or predicted values of the prices, such that a bid-offer condition resulting in no contract being executed is excluded, perform the charge-discharge optimization processing again, and perform a search for a new optimal condition and determination of a bid-offer condition.

(d) Acquisition of Information on Buy and Sell Prices Through Notification

Figure 4A:
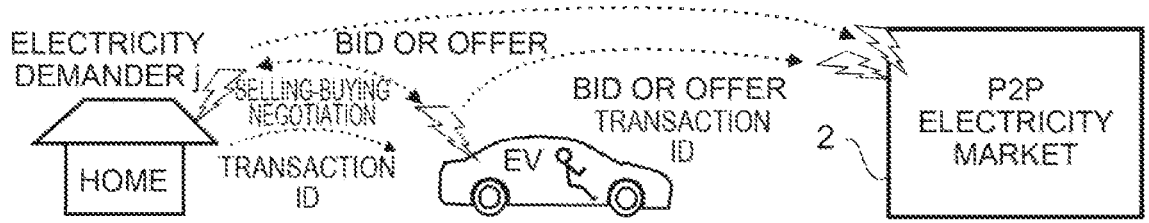
FIG. 4A is a schematic diagram for describing a case where a negotiation for selling and buying electricity is performed between an electricity demander and a mobile object before a bid and an offer are placed.

According to a configuration in another aspect (second aspect) of the apparatus that determines a bid-offer condition for an electricity transaction of a mobile object, a sell or buy price of electricity on a direct transaction market may be acquired through notification, before a bid and an offer are placed, from an electricity demander that places a bid or an offer on the direct transaction market, apart from the prediction using the climate information or the date and time information described above. In other words, a transaction of selling and buying electricity is proposed from the electricity demander to the mobile object, through notification of a sell or buy price of electricity on the direct transaction market from the electricity demander. The proposal of a transaction of selling and buying electricity from the electricity demander may be a proposal to sell electricity, or may be a proposal to buy electricity. The notification of a sell or buy price of electricity may be made from a plurality of electricity demanders separately. In the configuration, as schematically depicted in FIG. 4A, the mobile object receives a proposal of an electricity transaction with an electricity demander j by being notified of a sell or buy price of electricity from the electricity demander j via the bid-offer condition determination apparatus (selling-buying negotiation). Then, the bid-offer condition determination apparatus for the mobile object: performs the charge-discharge optimization processing by using information on the notified sell or buy price and information on other buy and sell prices acquired through prediction in combination; accepts a transaction of selling and buying electricity proposed by the electricity demander j (agreement in negotiation) when the transaction of selling and buying electricity using the notified sell or buy price gives an optimal condition, on the condition that the transaction of selling and buying electricity proposed by the electricity demander j does not affect electricity involved with another transaction of selling and buying electricity; and determines a condition for the selling and buying transaction proposed by the electricity demander j as a bid-offer condition used on the direct transaction market where the electricity demander j places a bid or an offer. Thus, with the condition, each of the mobile object and the electricity demander j places a bid or an offer on the direct transaction market. In order for the electricity demander j to be able to identify the bid or offer of the mobile object for the transaction agreed in the negotiation on the direct transaction market, the electricity demander j may give identification information on the transaction (transaction ID) to the mobile object, and the mobile object may attach the transaction ID when placing the bid or offer.

Figure 4B:
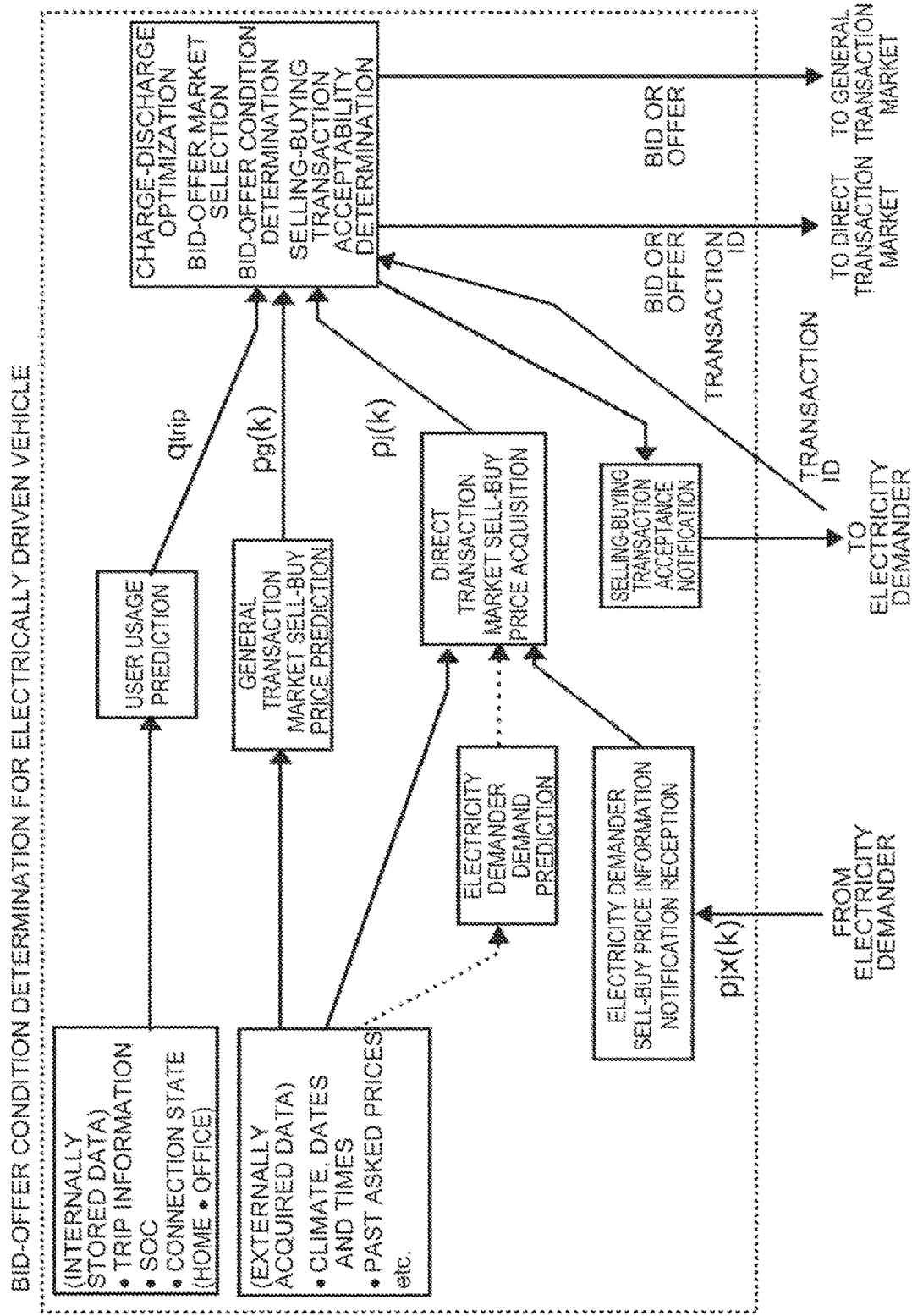
FIG. 4B shows, in a form of a block diagram, a configuration in a second aspect of the bid-offer condition determination apparatus for mobile object (electrically driven vehicle) according to the embodiment, configured to receive a sell-buy proposal notification from an electricity demander.

Referring to FIG. 4B, in addition to the configuration in FIG. 3, the configuration in the second aspect of the bid-offer condition determination apparatus is provided with a section that receives a notification of information on a sell or buy price of electricity on a direct transaction market from an electricity demander, and the information on the sell or buy price notified to the section is given, as one piece of the information on the sell and buy prices on the direct transaction markets, to the charge-discharge optimization processing section via the direct transaction market sell-buy price acquisition section. At the charge-discharge optimization processing section, when there is any information on a sell or buy price notified, processing of determining whether or not a selling and buying transaction using the notified sell or buy price can be accepted (selling-buying transaction acceptability determination processing) may be performed along with the charge-discharge optimization processing. A selling-buying transaction acceptance notification section may be provided that notifies acceptance of the selling and buying transaction to the electricity demander when the transaction of selling and buying electricity on the direct transaction market proposed from the electricity demander is accepted as a result of the selling-buying transaction acceptability determination processing. Moreover, when the electricity demander receives the acceptance of the selling and buying transaction, the electricity demander may give identification information (transaction ID) for identifying the transaction to the mobile object, and the mobile object may transmit the transaction ID together with a bid-offer condition when placing a bid or an offer.

Figure 5:
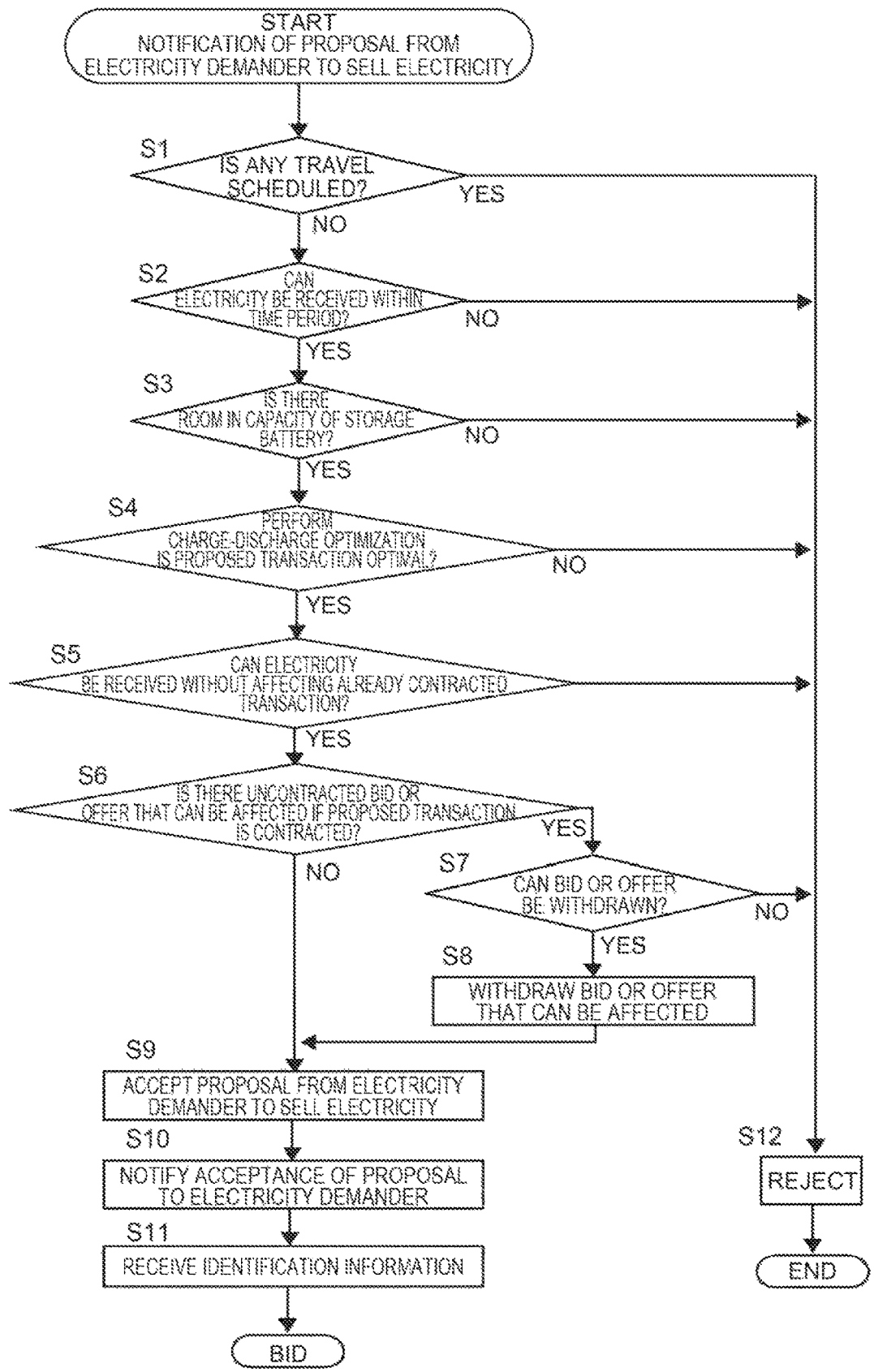
FIG. 5 shows, in a form of a flowchart, processing in the bid-offer condition determination apparatus for mobile object according to the configuration in FIG. 4, performed when a proposal to sell electricity is presented from an electricity demander.

In the selling-buying transaction acceptability determination processing, specifically, referring to FIG. 5, when a transaction of selling and buying electricity proposed by an electricity demander is a proposal that the electricity demander sells electricity to the mobile object, it is determined, after notification of the proposal to sell electricity is received from the electricity demander, whether or not the mobile object is scheduled to travel (step 1). Here, when the mobile object is scheduled to travel (electricity cannot be transmitted during travel), the proposal to sell electricity cannot be accepted and is therefore rejected (step 12), and the processing is terminated. When the mobile object is not scheduled to travel and can connect to a charger-discharger facility at the electricity demander, it is determined whether or not the mobile object can connect to and receive electricity at the charger-discharger facility in a time period of the selling of electricity proposed by the electricity demander (step 2), and whether or not there is a room in the capacity of the storage battery of the mobile object in the time period of receiving electricity (step 3). When the mobile object can receive electricity and there is a room in the capacity of the storage battery in the time period of the selling of electricity proposed by the electricity demander, the charge-discharge optimization processing is performed (step 4). When it is detected that the transaction of selling electricity proposed by the electricity demander gives an optimal condition, it is checked whether another already contracted transaction is not affected by the selling of electricity proposed by the electricity demander (step 5). Here, specifically, it is checked whether or not a room for electricity to be received under the other contract is secured in the capacity of the storage battery, or the like, even if electricity is received by accepting the selling of electricity proposed by the electricity demander. Here, when it is confirmed that the other already contracted transaction is not affected, it is next checked whether or not there is any other uncontracted bid or offer that can be affected if the transaction of selling electricity proposed by the electricity demander is contracted (any bid or offer that can suffer an effect, such inability of receiving electricity, due to insufficiency of the capacity of the storage battery if electricity is received by accepting the selling of electricity proposed by the electricity demander) (step 6), and it is checked, when there is another uncontracted bid or offer that can be affected, whether or not the bid or offer can be withdrawn (step 7). When there is no other uncontracted bid or offer that can be affected, or when such another uncontracted bid or offer can be withdrawn and the other uncontracted bid or offer is withdrawn (step 8), it is determined that the proposal from the electricity demander to sell electricity is accepted (step 9), and acceptance of the proposal to sell electricity is notified to the electricity demander (step 10). Then, since identification information (transaction ID) for identifying the transaction is transmitted from the electricity demander, the transaction ID may be received (step 11), and then a bid may be placed. When electricity cannot be received in the time period of the selling of electricity proposed by the electricity demander (step 2), when there is no room in the capacity of the storage battery (step 3), when the transaction of selling electricity proposed by the electricity demander does not give an optimal condition in charge-discharge optimization (step 4), when there is another contracted transaction that can be affected (step 5), or when another uncontracted bid or offer that can be affected cannot be withdrawn (steps 6, 7), the proposal to sell electricity cannot be accepted and is therefore rejected (step 12), and the processing is terminated.

Figure 6:
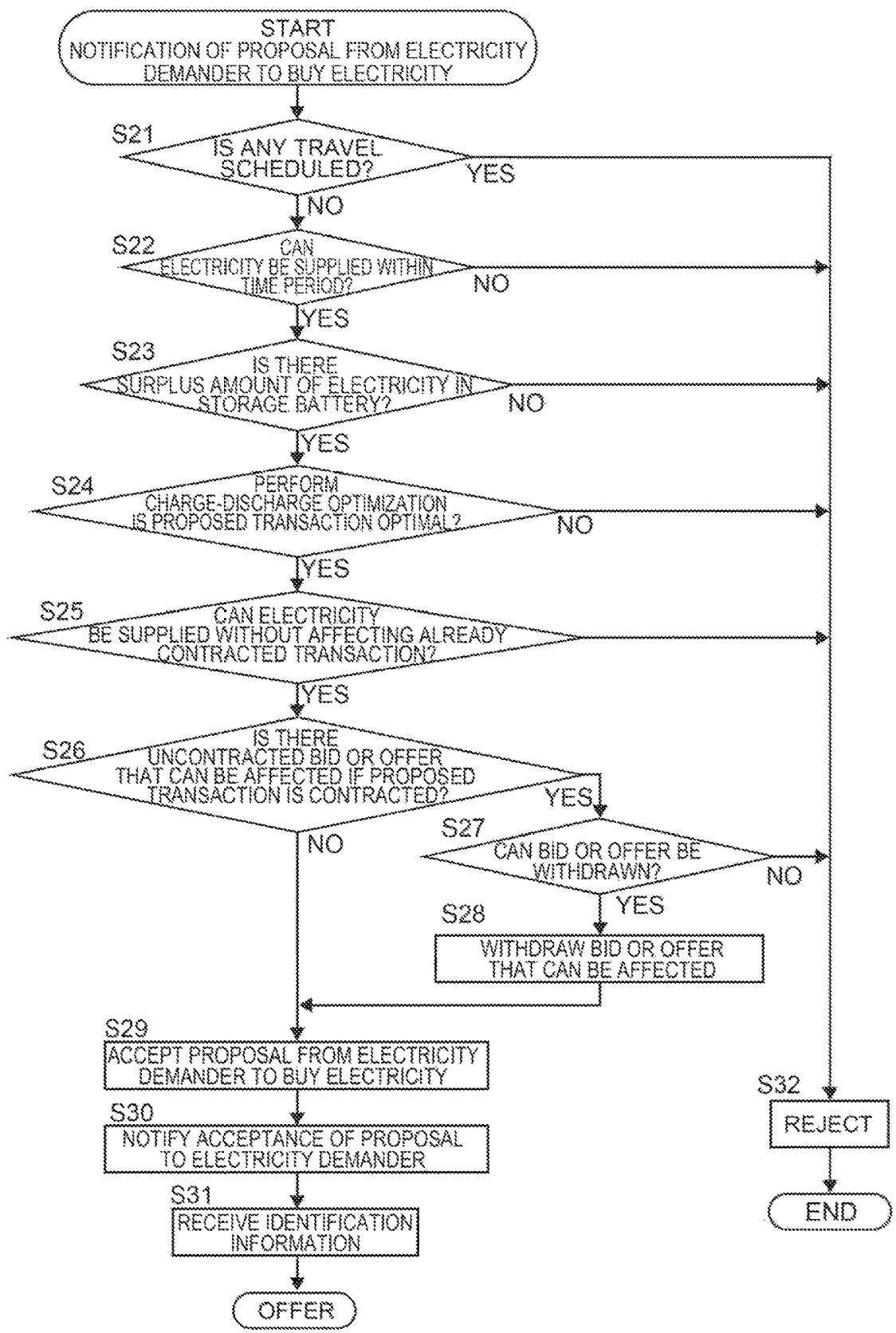
FIG. 6 shows, in a form of a flowchart, processing in the bid-offer condition determination apparatus for mobile object according to the configuration in FIG. 4, performed when a proposal to buy electricity is presented from an electricity demander.

Next, referring to FIG. 6, when a transaction of selling and buying electricity proposed by an electricity demander is a proposal that the electricity demander buys electricity from the mobile object, specifically, it is determined, after notification of the proposal to buy electricity is received from the electricity demander, whether or not the mobile object is scheduled to travel (step 21). Here, when the mobile object is scheduled to travel, the proposal to buy electricity cannot be accepted and is therefore rejected (step 32), and the processing is terminated. When the mobile object is not scheduled to travel and can connect to a charger-discharger facility at the electricity demander, it is determined whether or not the mobile object can connect to and supply electricity at the charger-discharger facility in a time period of the buying of electricity proposed by the electricity demander (step 22), and whether or not there is a surplus amount of electricity in the storage battery of the mobile object in the time period of supplying electricity (step 23). When the mobile object can supply electricity and there is a surplus amount of electricity in the storage battery in the time period of the buying of electricity proposed by the electricity demander, the charge-discharge optimization processing is performed (step 24). When it is detected that the transaction of buying electricity proposed by the electricity demander gives an optimal condition, it is checked whether another already contracted transaction is not affected by the buying of electricity proposed by the electricity demander (step 25). Here, specifically, it is checked whether or not surplus electricity to be supplied under the other contract is secured in the surplus amount of electricity in the storage battery, or the like, even if electricity is supplied by accepting the buying of electricity proposed by the electricity demander. Here, when it is confirmed that the other already contracted transaction is not affected, it is next checked whether or not there is any other uncontracted bid or offer that can be affected if the transaction of buying electricity proposed by the electricity demander is contracted (any bid or offer that can suffer an effect, such inability of supplying electricity, due to a shortage of the surplus amount of electricity in the storage battery if electricity is supplied by accepting the buying of electricity proposed by the electricity demander) (step 26), and it is checked, when there is another uncontracted bid or offer that can be affected, whether or not the bid or offer can be withdrawn (step 27). When there is no other uncontracted bid or offer that can be affected, or when such another uncontracted bid or offer can be withdrawn and the other uncontracted bid or offer is withdrawn (step 28), it is determined that the proposal from the electricity demander to buy electricity is accepted (step 29), and acceptance of the proposal to buy electricity is notified to the electricity demander (step 30). Then, since identification information (transaction ID) for identifying the transaction is transmitted from the electricity demander, the transaction ID may be received (step 31), and then an offer may be placed. When electricity cannot be supplied in the time period of the buying of electricity proposed by the electricity demander (step 22), when the surplus amount of electricity in the storage battery is not enough (step 23), when the transaction of buying electricity proposed by the electricity demander does not give an optimal condition in charge-discharge optimization (step 24), when there is another contracted transaction that can be affected (step 25), or when another uncontracted bid or offer that can be affected cannot be withdrawn (steps 26, 27), the proposal to buy electricity cannot be accepted and is therefore rejected (step 32), and the processing is terminated.

In the configuration in which a notification of a proposal for an electricity transaction is received from an electricity demander, the storage battery of the mobile object can be controlled to some extent by controlling a content of the notification on the electricity demander side, such as a home, a shop, or a company. For example, if a home presents a higher buy price of electricity in the night, it is possible to actively encourage mobile objects to discharge electricity, or the like, during the night. Moreover, since an electricity demander and a mobile object can negotiate about a transaction of selling and buying electricity before a bid and an offer are placed, an advantage is brought about that a source of procurement, or a destination of supply, of electricity can be more reliably found when electricity demand is high or when the surplus amount of electricity is large.

(e) Consideration of Cost for Detour to Electricity Demander

As described already, electricity transmission based on a transaction of selling and buying electricity through a direct transaction market is conducted by a mobile object moving to a charger-discharger facility in a premise of an electricity demander. In this respect, as schematically depicted in FIG. 7A, when a premise of an electricity demander j is located well off a travel route planned by a mobile object EV, the mobile object EV needs to make a detour to a place of the electricity demander j when conducting a transaction of selling and buying electricity with the electricity demander j, so consumes an extra amount of electricity $\Delta qj$ for the detour, and accordingly incurs a corresponding cost $P_P \cdot \Delta qj$ (where $P_P$ is a price per unit amount of electricity). Hence, in a further preferred aspect (third aspect) of the apparatus according to the present embodiment, when the premise of the electricity demander j does not exist on the travel route (future travel route) planned by the mobile object EV, a cost (detour loss) required to make a detour to the premise of the electricity demander j by deviating from the planned travel route may be taken into consideration in the charge-discharge optimization processing.

Referring to FIG. 7B, in addition to the configuration in FIG. 3, the configuration in the third aspect of the bid-offer condition determination apparatus is first provided with a travel route determination section that determines a future travel route of the mobile object, and a detour cost calculation section that calculates a cost required to make a detour to a premise of an electricity demander j. In operation, the travel route determination section may be configured to first determine a future travel route by using data collected by the internally stored data collection section, or may be configured to adopt, as a future travel route, a travel route determined by an arbitrary navigation device when a driver sets a destination. Moreover, the travel route determination section determines a travel route to be taken when a detour is made to the premise of the electricity demander j (an electricity demander under evaluation of a profit or a loss from an electricity transaction, performed by using the objective function in the charge-discharge optimization processing), calculates a route difference between when the future travel route is traveled without making any detour and when a detour to the premise of the electricity demander j is made, and estimates the amount of electricity (detour amount of electricity) Δqj consumed for the route difference. Note that when a plurality of electricity demanders are evaluated in the charge-discharge optimization processing, the detour amount of electricity may be estimated for each electricity demander.

Thereafter, the detour amount of electricity Δqj with respect to the electricity demander j may be given to the detour cost calculation section, where the detour amount of electricity Δqj may be multiplied by the price $P_P$ per unit amount of electricity, and the detour cost $P_P \cdot \Delta qj$ with respect to the electricity demander j may be thus calculated. For the price $P_P$ per unit amount of electricity, any appropriate price may be selected. For example, the price $P_P$ may be selected as appropriate from a price determined by an electric power company with which an owner of the mobile object has entered into a contract, an average value of costs for an amount of electricity incurred by the mobile object in a predetermined time period (for example, past one month), and the like.

The thus calculated detour cost $P_P \cdot \Delta qj$ with respect to the electricity demander j is factored into the objective function in the charge-discharge optimization processing, as described above. Specifically, the expression (1) may be corrected to a following expression:

[Expression 5]

$$f_{cos\ t}(i, n) = \sum_{k=i}^{i+n} r_{connect}(k) \cdot F_g(k) + \sum_{j}^{m} \left\{ u_{connect}^j \cdot \left[ \sum_{k=i}^{i+n} F_j(k) + P_p \cdot \Delta q_j \right] \right\} \quad (6)$$

where $u_{connect}^i$ is a variable that is 1 when a detour to the electricity demander j is made, and otherwise 0. According to such a configuration, an optimal condition, including the detour cost $P_P \cdot \Delta qj$, is detected, and a destination of selling or a source of buying of electricity can be determined more adequately. The configuration is expected to enable an optimal route and economic efficiency to be presented, particularly in operation by automatic driving.

SUPPLEMENT RELATED TO CONFIGURATION OF ELECTRICITY TRANSACTION SYSTEM

When the bid-offer condition determination apparatus for mobile object according to the present embodiment is used, a system in which P2P electricity transactions are conducted is configured to accept a bid or an offer according to a condition determined by the bid-offer condition determination apparatus. When the second aspect described with reference to FIG. 4 is applied, a system on the electricity demander side is provided with: a configuration that proposes a transaction of selling and buying electricity on a direct transaction market and notifies information on a sell or buy price in the proposed transaction to the bid-offer condition determination apparatus for the mobile object; and a configuration that gives a transaction ID to the mobile object when the proposal for the selling and buying transaction is accepted. A system of the direct transaction market is provided with a configuration that executes a contract for a bid and an offer to which the given transaction ID is attached.

Although the above description has been given in connection with the embodiment of the present disclosure, many modifications and changes can be made by those skilled in the art. It is obvious that an applicable embodiment of the present disclosure is not limited only to the embodiment illustrated above, and can be applied to various apparatuses without departing from the conception of the present disclosure.

What is claimed is:

1. A computer apparatus, associated with a mobile object, that determines a bid-offer condition for a transaction of selling and buying an amount of electricity on at least one electricity transaction market, comprising:
a memory device storing program instructions;
a computer processing device configured to execute the program instructions to perform operations comprising:
determining information on sell and buy prices for an amount of electricity in each of unit time periods on each of the at least one electricity transaction market using an electricity amount sell-buy price acquisition section of the computer processing device;
determining, for each of the unit time periods, an electricity transaction market, a sell or buy price, and an amount of electricity to be charged into or discharged from a storage battery of the mobile object in an optimal condition using a charge-discharge optimization section of the computer processing device, by detecting the optimal condition that maximizes a profit or minimizes a loss in terms of an index value, which represents a profit gained or a loss incurred from selling or buying of the amount of electricity by the mobile object on the electricity transaction market, within ranges of dischargeable and chargeable amounts of electricity of the storage battery of the mobile object over at least one of the unit time periods, based on the information on the sell and buy prices for the amount of electricity acquired by the electricity amount sell-buy price acquisition section;
determining, as the bid-offer condition on the at least one electricity transaction market, for each of the unit time periods, whether to place an offer or a bid on the electricity transaction market determined by the charge-discharge optimization section, at the sell or buy price for the amount of electricity to be discharged or charged determined by the charge-discharge optimization section using a bid-offer condition determination section of the computer processing device,
predicting a future travel route of the mobile object using a travel route prediction section of the computer processing device; and
calculating a detour loss that is a loss required to make a detour to a charger-discharger facility of an electricity demander that places a bid or offer on a direct transaction market selected as the at least one electricity transaction market using a detour loss calculation section of the computer processing device when the charger-discharger facility of the electricity demander does not exist on the predicted future travel route,
wherein the charge-discharge optimization section is configured to detect, as the optimal condition, the condition that maximizes a profit or minimizes a loss, with the detour loss included in the profit gained or the loss incurred from selling or buying the amount of electricity on the electricity transaction market, wherein for the at least one electricity transaction market, the direct transaction market is selectable, on which a contract is executed for an electricity transaction in which electricity is transmitted directly between the mobile object and the electricity demander, and the electricity amount sell-buy price acquisition section is configured to acquire, as the sell and buy prices for the amount of electricity, a sell or buy price for the amount of electricity in each of the unit time periods presented by the electricity demander on the direct transaction market.

2. The computer apparatus according to claim 1, wherein the electricity amount sell-buy price acquisition section is configured to acquire, as the sell and buy prices for the amount of electricity in each of the unit time periods on each electricity transaction market, information on sell and buy prices for the amount of electricity in each of the unit time periods on a general transaction market, the sell and buy prices predicted based on climate information or date and time information, and the charge-discharge optimization section is configured to detect the optimal condition, based on the sell or buy price on the direct transaction market and the sell and buy prices on the general transaction market.

3. The computer apparatus according to claim 1, wherein the electricity amount sell-buy price acquisition section is configured to acquire the sell or buy price for the amount of electricity in each of the unit time periods presented by the electricity demander on the direct transaction market, by predicting the sell or buy price based on climate information or date and time information.

4. The computer apparatus according to claim 3, further comprising a section that predicts an amount of electricity demanded by the electricity demander over at least one of the unit time periods, based on the climate information or the date and time information, wherein the electricity amount sell-buy price acquisition section is configured to predict the sell or buy price for the amount of electricity in each of the unit time periods presented by the electricity demander on the direct transaction market, based on the predicted demanded amount of electricity.

5. The computer apparatus according to claim 1, further comprising:

a sell-buy price information notification reception section that receives a notification of the information on the sell or buy price presented by the electricity demander on the direct transaction market; and a selling-buying transaction acceptance notification section that, when a transaction of selling and buying electricity using the sell or buy price presented by the electricity demander on the direct transaction market is accepted, transmits a notification of acceptance of the transaction of selling and buying electricity to the electricity demander, wherein the electricity amount sell-buy price acquisition section is configured to acquire, as the information on the sell and buy prices for an electricity amount in each of the unit time periods on each electricity transaction market, the information on the sell or buy price notified via the sell-buy price information notification reception section, and the selling-buying transaction acceptance notification section is configured to, when the charge-discharge optimization section detects one of conditions for the transaction of selling and buying electricity using the notified sell or buy price as the optimal condition, transmit a notification of acceptance of the transaction of selling and buying electricity to the electricity demander that presents the sell or buy price in the transaction of selling and buying electricity detected as the optimal condition, after it is confirmed that another transaction of selling and buying electricity is not affected by the transaction of selling and buying electricity using the sell or buy price detected as the optimal condition.

6. The computer apparatus according to claim 5, wherein the bid-offer condition determination section is configured to, when the selling-buying transaction acceptance notification section transmits the notification of acceptance of the transaction of selling and buying electricity to the electricity demander, include, in the bid-offer condition, identification information that allows the electricity demander to identify the accepted transaction of selling and buying electricity.

* * * * *